Fig. 1.

(No Model.) 7 Sheets—Sheet 2.

W. C. HOWARD, Dec'd.
W. Howard, Administrator.
MAIL MARKING MACHINE.

No. 506,506. Patented Oct. 10, 1893.

Witnesses

William Howard Admr.
of the estate of Wm Cecil
Howard Inventor by his Attorneys (No Model.)
7 Sheets—Sheet 3.

W. C. HOWARD, Dec'd.
W. HOWARD, Administrator.
MAIL MARKING MACHINE.

No. 506,506.
Patented Oct. 10, 1893.

Witnesses

William Howard Admr. of the
Estate of Wm Cecil Howard Inventor
By
C. W. Dudley & Co
his Attorneys (No Model.)

W. C. HOWARD, Dec'd.
W. HOWARD, Administrator.
MAIL MARKING MACHINE.

Patented Oct. 10, 1893.

Witnesses
*Will T. Norton*
*Geo. H. Brown*

William Howard Admin.
of the Estate of
Wm Cecil Howard Inventor
By
*W. W. Dudley & Co*
his Attorneys.

(No Model.) 7 Sheets—Sheet 5.

W. C. HOWARD, Dec'd.
W. HOWARD, Administrator.
MAIL MARKING MACHINE.

No. 506,506. Patented Oct. 10, 1893.

Fig. 10.

(No Model.)

W. C. HOWARD, Dec'd.
W. HOWARD, Administrator.
MAIL MARKING MACHINE.

Patented Oct. 10, 1893.

Fig.13.

UNITED STATES PATENT OFFICE.

WILLIAM HOWARD, OF WASHINGTON, DISTRICT OF COLUMBIA, ADMINISTRATOR OF WILLIAM CECIL HOWARD, DECEASED, ASSIGNOR TO THOMAS S. CONSTANTINE, OF NEW YORK, N. Y.

MAIL-MARKING MACHINE.

SPECIFICATION forming part of Letters Patent No. 506,506, dated October 10, 1893.

Application filed December 15, 1892. Serial No. 455,261. (No model.)

*To all whom it may concern:*

Be it known that I, WILLIAM HOWARD, a citizen of the United States, residing at Washington, in the District of Columbia, administrator of the estate of WILLIAM CECIL HOWARD, deceased, and late a citizen of the United States, who resided at Washington, in the District of Columbia, and who invented certain new and useful Improvements in Mail-Marking Machines, do declare the following to be a full, clear, and exact description of the invention, such as will enable others skilled in the art to which it appertains to make and use the same, reference being had to the accompanying drawings, and to the figures of reference marked thereon, which form a part of this specification.

The invention has reference to machines for canceling stamps and post-marking mail matter, and has for its object to provide such a machine in which are combined simplicity of construction and effectiveness in operation, and which will overcome the many disadvantages due to the use of existing machines, and increase the capacity.

The invention consists of a machine of this character which is adapted for a high rate of speed, and in which are employed two horizontally arranged rollers adapted to continuously and simultaneously revolve, one of said rollers having thereon the impression stamp for imparting the necessary cancellation and post marks, and the other roller constituting the compression roller and having arranged thereon a yielding compression plate which moves at each complete revolution of the rollers into relation with the impression stamp to form a backing for the letters or other mail matter during the stamping operation; mechanism operating normally to prevent the contact of the stamp and compression plate to prevent the inking of the latter when no letters are presented for impression; mechanism operated by the letter to be impressed to bring the stamp and compression plate into contact; an automatic feeding device for supplying the letters or other mail matter to the machine; mechanism for separating the letters individually from the stack; a screw conveyer adapted to receive the letters from the separating mechanism and convey them in their separated condition; an endless belt adjacent to the end of the conveyer which operates to move the letters forward into position to receive the impression; and a table arranged to receive the impressed letters and to automatically re-stack them.

The invention also consists in the construction, relative arrangement and operation of the several parts constituting the improved postmarking and stamp-canceling machine, all of which will hereinafter fully and clearly appear from a reading of the following description taken in connection with the accompanying drawings which form a part thereof, and in which—

The same numerals of reference denote the the same parts in the several figures of the drawings.

Figure 1:
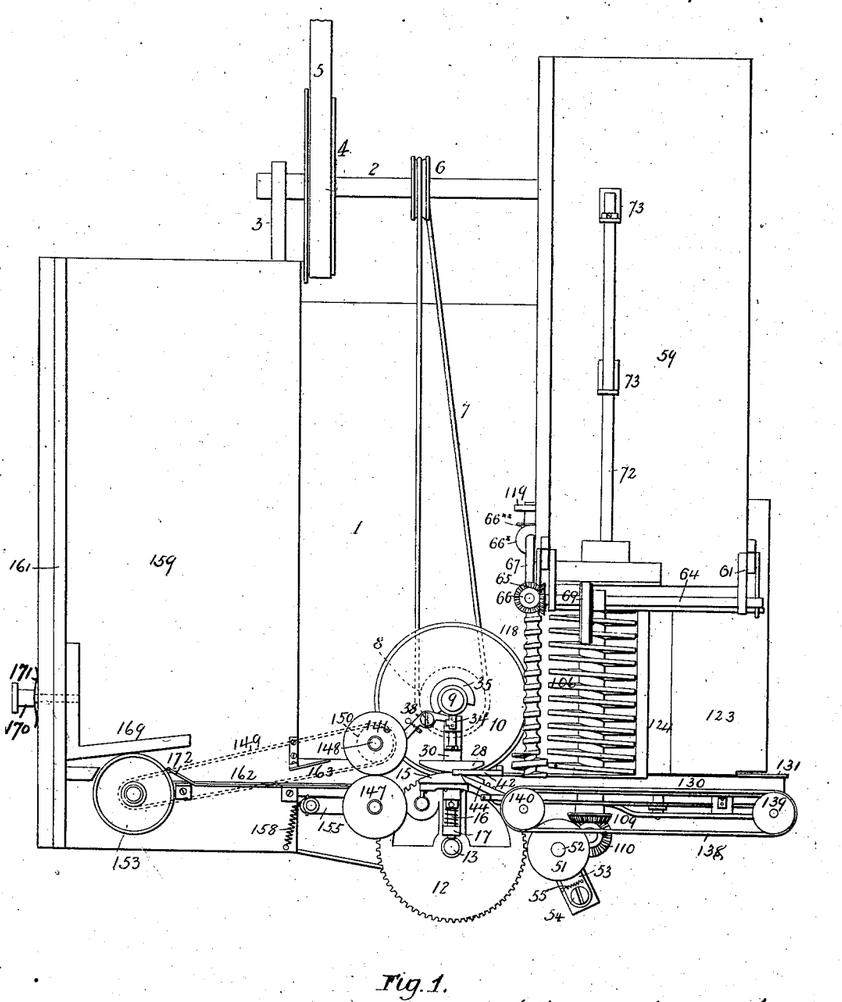
Figure 1 illustrates the machine in plan view.
Figure 2:
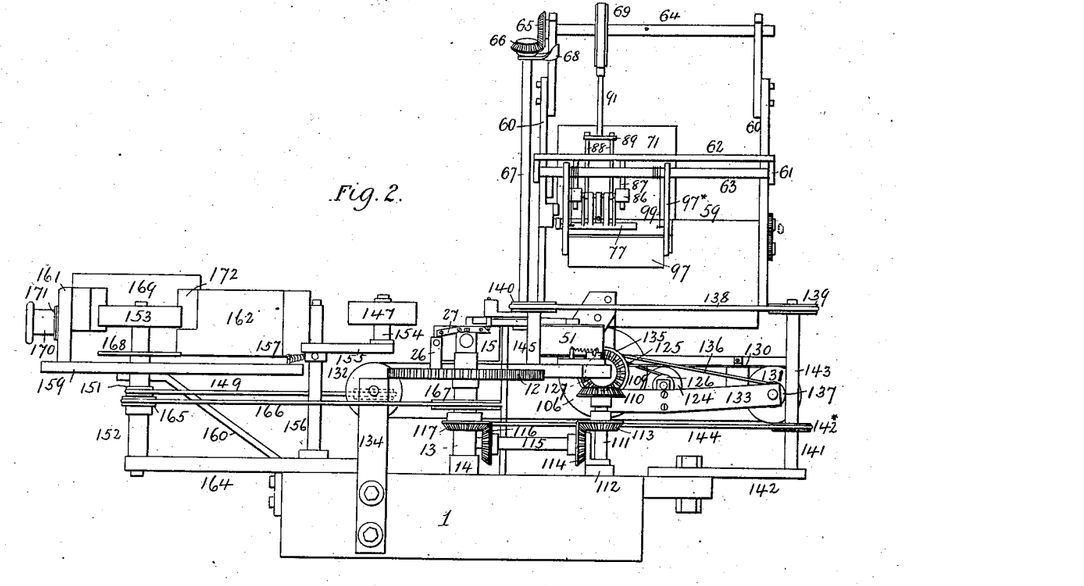
Fig. 2 a front elevation thereof.

The reference numeral 1 denotes the bed of the machine which may be mounted on any suitable table or frame and which supports the several mechanisms presently to be described. At one end of the bed is the driving shaft 2 which is mounted in bearings arranged on arms 3 bolted to the sides of the bed.

Fixedly secured to the shaft is a driving pulley 4 which is connected with any suitable power by a belt 5; and 6 is a sheave on said shaft which imparts motion to the compression roller through a quarter-turn belt 7 which is passed around said sheave and a horizontal sheave 8 connected to said roller and mounted on a vertical spindle 9. The compression roller consists of a disk 10 which supports the compression plate and the mechanism for restraining and releasing said plate, the construction and operation of which will presently appear.

11 is a gear wheel which is arranged concentrically with and below the disk and is fixedly secured thereto and to the sheave 8, and adapted to move therewith and engage the teeth of a similar gear wheel 12 mounted on a spindle 13 vertically supported on a bracket 14 bolted to the top of the bed. The gear wheel 12 supports the impression stamp, the latter consisting of a die 15 the outer surface being curved to conform to the periphery of said gear wheel, and provided with the necessary lines and type for the impression of the letters or other mail matter. This die has a spindle 16 which is mounted in two standards 17 secured on the upper portion of the gear wheel, and the die is normally extended by the action of a coil-spring 18 which surrounds the spindle and is interposed between the inner standard and a collar 19 adjustably secured to the spindle by a set screw 20.

Figure 3:
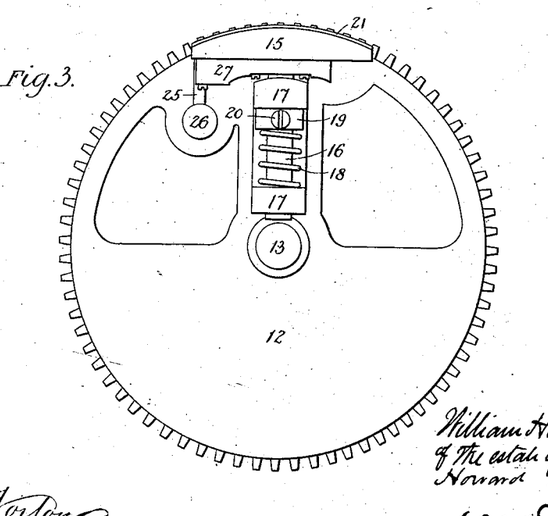
Fig. 3 a plan view of the impression stamp.
Figure 4:
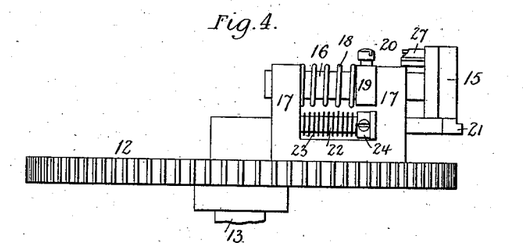
Fig. 4 a side elevation of said stamp.

Adjacent to the under side of the die is a rib 21, the outer surface of which conforms to the surface of the die but extends normally a slight distance beyond for a purpose to be explained. This rib has a spindle 22 mounted in the standards 17, and 23 is a spring which surrounds the spindle and is interposed between the inner standard and a collar 24 as shown.

25 is a stud on the inner side of the die which moves in a guide standard 26 on the gear wheel, and holds the die in its proper position.

On the upper inner side of the die is a cam 27 the operation of which will presently appear.

Figure 7:
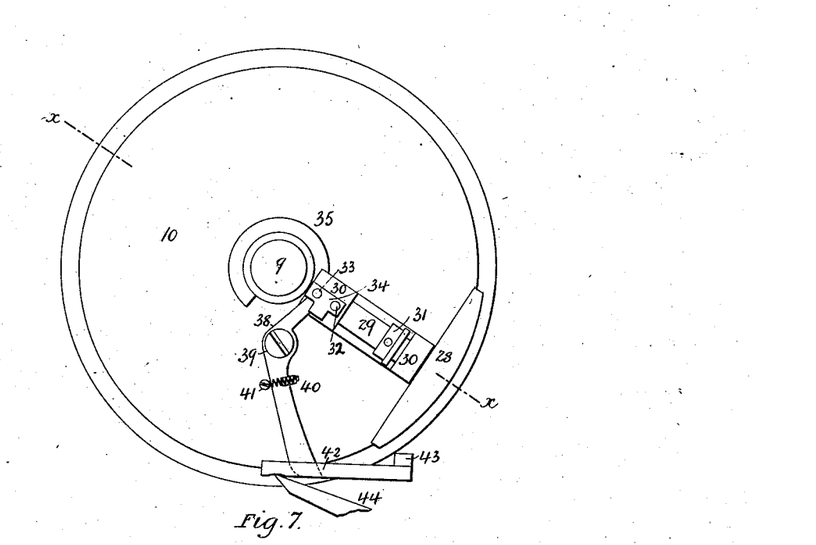
Fig. 7 a plan view of the compression plate, and showing the mechanism for restraining and releasing said plate.
Figure 8:
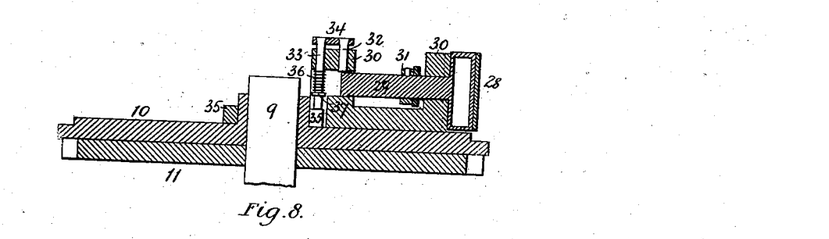
Fig. 8 a vertical section taken in line $x—x$ Fig. 7.

The compression plate 28 is mounted on the disk 10 and is curved on its outer surface in order to form an even contact with the die during the stamping operation. The spindle 29 of this plate is mounted in standards 30 on the disk 10 and the outward movement is limited by a collar 31 secured to the spindle as shown. The plate is normally extended by centrifugal action due to the rapid revolution of the compression roller, and when no letter is presented for impression this plate is moved backward or restrained at each complete revolution by the action of the rib 21, the spring 23 being of sufficient tension to overcome the centrifugal force exerted on the plate, and the latter is in consequence prevented from contacting with the surface of the die and receiving the impression which would ink the backs of the letter or letters presented thereafter.

Mechanism is provided for automatically bringing said plate into positive contact with the die during the operation of stamping a letter as follows:—In the rear standard 30 are mounted two vertically arranged pins 32, 33, which are connected at their upper ends to a plate 34. The inner end of the spindle 29 terminates normally adjacent to the pin 32 and when the latter is raised above the spindle the plate 28 is free to move to the rear as is the case when no letter is presented. The pins and plate 34 are raised to their normal positions by the action of a cam 35 which partially surrounds and is fixedly secured to the spindle of the compression roller, which cam engages the lower end of pin 33 and raises it against the action of a coil-spring 36 thereon which is compressed between the upper side of an opening in the standard, and a collar 37 as shown. The pins and plate 34 are normally locked in their raised positions by the action of a trip lever 38 which is pivotally connected to a post 39 on the top of the disk. The inner end of this lever is normally interposed between the plate 34 and top of the standard and holds said plate and the pins raised against the action of the spring 36, the lever being held in this position by the action of a spring 40 secured at one end to said lever and at the other end to a post 41 on the disk. The outer end of this lever is moved at each complete revolution of the roller into the path of the letter to be impressed, and is engaged by the letter a little in advance of the stamping operation, the outer end of the lever being moved in a direction opposite to the rotation of the disk, and the inner end of the lever is thereby disengaged from the plate 34 which latter with the pins are depressed by the action of the spring 36 and the pin 32 moving downward is engaged by the inner end of the spindle of the compression plate, thereby locking the latter and presenting it in unyielding contact with the die, the rib 21 being thereby depressed.

Figure 5:
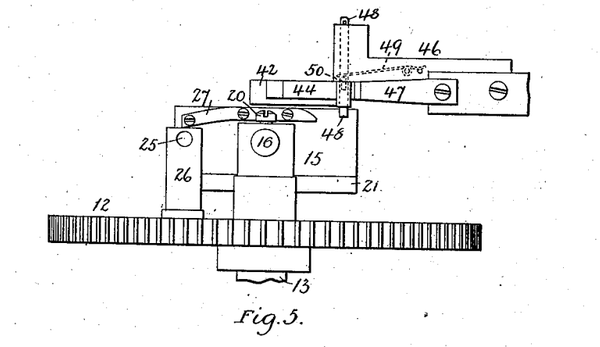
Fig. 5 a rear elevation of the stamp, and showing the mechanism for temporarily holding the letters in position before receiving the impression.
Figure 6:
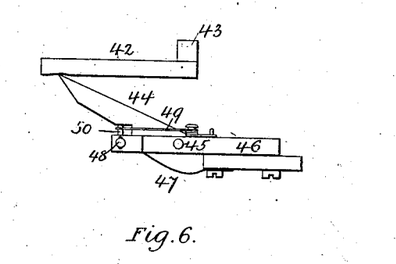
Fig. 6 a top view of such letter holding device in detail.

The mechanism for temporarily retaining the letters in position to be taken by the die consists of a fixed finger 42 horizontally supported on a post 43 secured to the bed of the machine; and a yielding finger 44 which is pivoted at 45 to a bracket 46 as shown, and normally held in contact with the finger 42 by the action of a leaf spring 47, and by locking mechanism which is unlocked at each complete revolution of the die and consists of a pin 48 vertically mounted in said bracket and normally depressed by the action of a spring 49. This pin has a stud 50 which, when the former is depressed, engages the outer side of the finger 44 and locks it against the finger 42 during a partial revolution of the die, and these fingers operate to hold a letter in position to be seized and carried forward between the die and compression plate. The yielding finger is unlocked in advance of the stamping operation, by the action of cam 27 on the die, which engages the lower end of the pin 48 and raises it sufficiently to clear the stud from the said finger and permit the latter to be moved outward sufficiently to accommodate the passage of the letter as it is carried forward by the die and compression plate.

Figure 9:
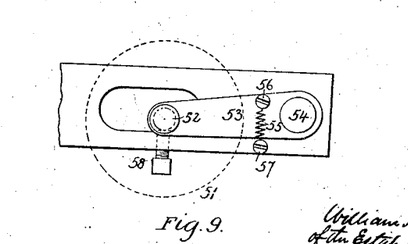
Fig. 9 a detail view of the inking device, the ink roller being shown in dotted lines.

Ink is supplied to the die by an ink roller 51 the surface of which is in the path of the die, and said roller is mounted on a spindle 52 secured to an arm 53 pivoted at 54 to a bracket secured to the bed. The roller has a yielding contact with the die through the action of a spring 55 which is secured to a pin 56 on the arm and to a post 57 on the bracket. A set screw 58 limits the inward movement of the roller and the latter is continuously rotated by the contact with the rapidly moving die.

Figure 10:
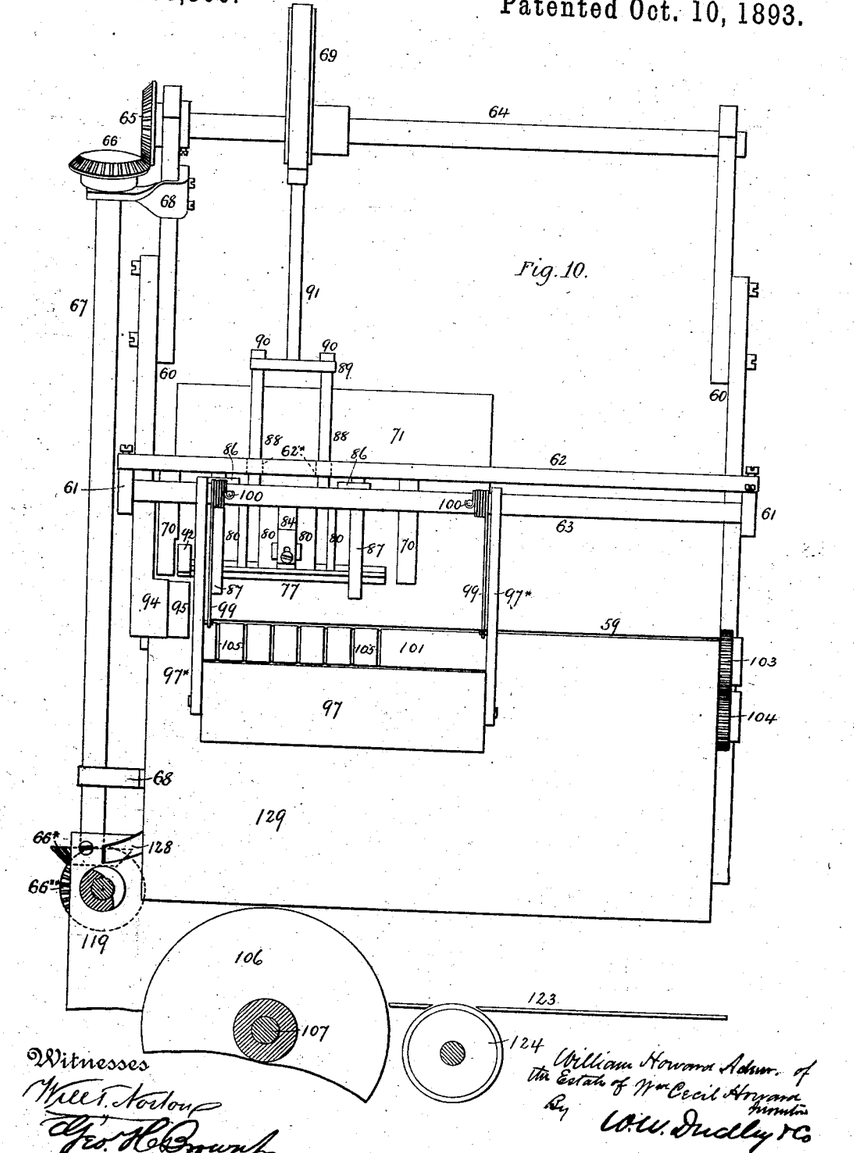
Fig. 10 a front elevation of the letter separating mechanism and showing the screw conveyer in relation thereto.
Figures 11, 12:
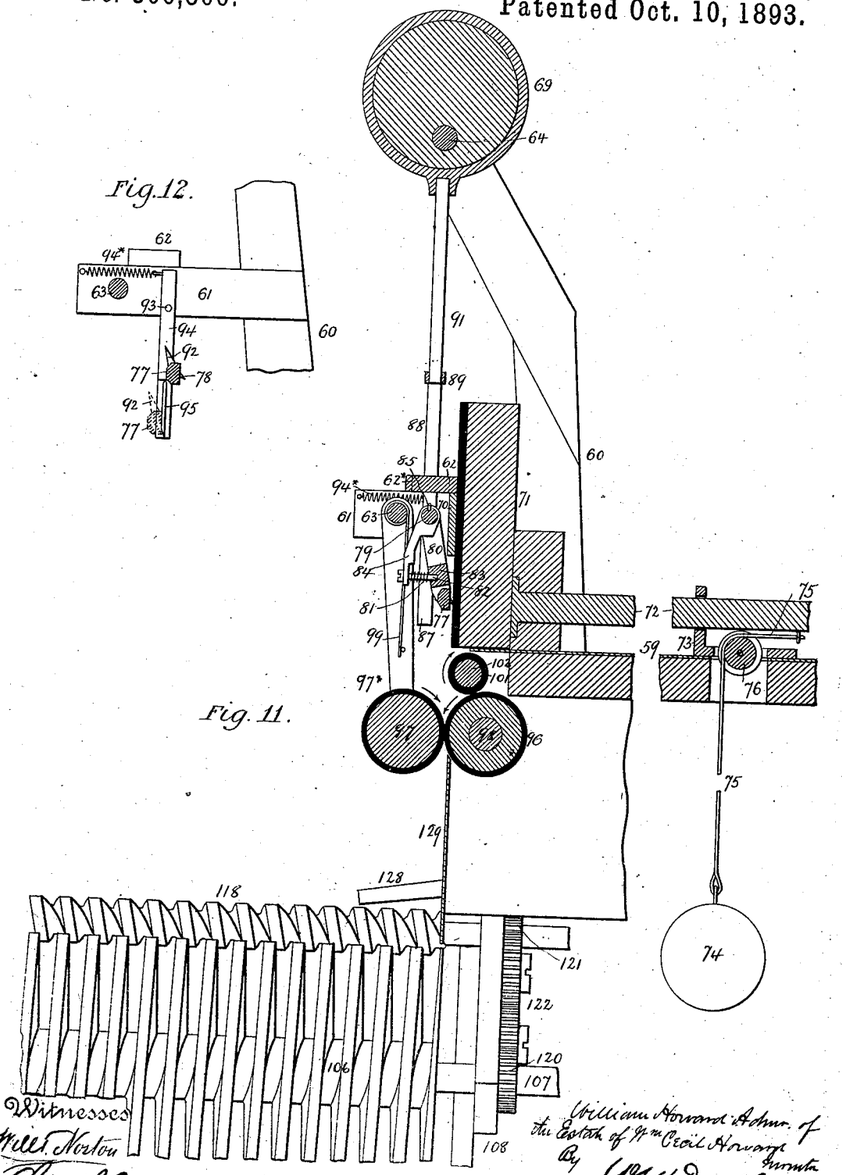
Fig. 11, a vertical longitudinal section of said separating mechanism, and showing the automatic letter feeding device, and the screw conveyer in relation thereto.
Fig. 12 a detail showing the mechanism for restraining and bringing into action the separator.

At one side and above the bed is a table 59 supported on suitable brackets, and on which the letters to be impressed are stacked by the operator. At the inner end of this table is the separating mechanism which is mounted on a frame consisting of uprights 60, bolted to the sides of the table, arms 61 secured to said uprights and cross bars 62 and 63 connecting said arms. In the upper ends of the uprights is journaled a shaft 64 having on its inner end a bevel-gear wheel 65 which meshes with a bevel gear wheel 66 on an inclined shaft 67 journaled in brackets 68 on one of the uprights and which is rotated through gear 66* thereon and a gear 66** on the spindle of the auxiliary screw conveyer presently to be described.

On the shaft 64 is mounted an eccentric 69 through which a vertically reciprocating movement is imparted to the separator which engages the letters singly and carries them in its downward movement as will be presently explained.

Extending downward from the cross bar 62 are face plates 70 forming a wall for the letters and other mail matter which are placed edgewise on the table and interposed between said wall and a follower 71 which is moved automatically to feed the letters forward to the separator. This follower is connected to a plunger rod 72 which is mounted in brackets 73 secured to the table and moved forward by the action of a weight 74 secured to a cord 75 which passes over a sheave 76 journaled in one of the brackets and is connected to the plunger rod as shown. This follower is moved backward by hand in order to replenish the stack and is moved forward automatically to feed the letters under pressure to the separator and by employing a weight a uniform pressure is imparted to the stack regardless of the number of letters composing the stack.

The separating mechanism consists of a finger 77 having on its inner side a series of projecting points 78 inclined slightly downward which operate to engage the surface of the adjacent letter and separate it by a downward movement from the stack: it being evident that the friction produced between the letter and the series of points will greatly exceed the friction between the letters, and the letters and other mail matter are thereby at each downward movement of the separator conveyed away separately. The finger 77 is pivotally secured to a shaft 79 by four arms 80, and has a yielding movement through the action of a coil-spring 81 which surrounds a pin 82 secured to a bridge piece 83 connecting the inner arms 80, and is compressed between said bridge piece and a downwardly projecting arm 84 rigidly secured at its upper end to the shaft 79 by a pin 85. The pin 82 is passed loosely through the arm 84, which permits such yielding movement. This shaft is secured at each end in blocks 86 which move on vertical guide rods 87 secured at their upper end to the cross bar 62. To the shaft are connected two arms 88 the upper ends of which are passed through a head 89 and are secured thereto by bolts 90; and this head is connected to the eccentric 69 by a rod 91. The arms 88 are passed through slots 62* in the cross bar 62 and these slots are sufficiently large to accommodate for the lateral movement of the said arms as will be understood. The rotation of the eccentric imparts a vertically reciprocating movement to the separating finger which as before stated operates to separate the letters on the downward movement thereof.

Mechanism is provided for restraining said finger on its upward movement, as follows:—On the inner end of the said finger is secured a wedge-shaped cam 92; and pivotally secured at 93 to the inner arm 61 is an arm 94 on which is a thin strip 95 arranged in the path of said cam. The cam is slightly inclined as shown in order that the point thereof shall normally extend beyond the outer face of the strip. On the downward movement of the finger the cam passes freely inside of the strip, and contact with the letters is permitted; when however, the finger commences its upward movement the cam engages the outer face of the strip and is forced outward thereby, the finger being moved therewith against the action of the spring 81 and restrained until the upward movement is completed when the cam disengages from the strip and allows the finger to spring back in its normal position to separate the next letter. By the foregoing all contact with the letters by the separating finger on its upward movement is obviated, as it is evident that a letter should pass downward free of the finger during the upward movement of the latter. The arm 94 has a yielding contact with the letters which is permitted by the action of a coil-spring 94* which is secured at one end to the upper portion of said arm and at the other end to a pin on the arm 61. The letter as it is disengaged from the finger is caught between two rollers 96, 97 which are covered with rubber or other suitable material to produce the necessary friction. The roller 96 is mounted on a shaft 98 journaled in bearings in the inner end of the machine and is rotated by belt connection with the driving shaft. The roller 97 is supported in the lower ends of two arms 97* which are pivotally connected at their other ends to the cross bar 63; and is rotated by frictional contact with the roller 96 against which it is held by the action of springs 99 secured at one end to the arms, and having the other end coiled around and secured to the said cross bar by pins 100.

A device is provided for preventing two or more letters from being carried down simultaneously by the separating finger; said device consisting of a roller 101 covered with rubber or its equivalent which is mounted on a shaft 102 journaled in the inner end of the table above the roller 96, and is rotated in a direction opposite to the downward movement of the separating finger, through a gear 103 secured to the outer end of the shaft which meshes with a gear 104 on the shaft 98. The surface of this roller is formed with transverse grooves 105 which register with and receive the points on the finger in order to make a close contact between the surface of the roller and the backs of the letters as they are carried downward. The foremost letters rest directly on this roller and in the event of two or more letters moving downward together, the revolution of the roller in the opposite direction separates the letters adjacent to the one engaged by the finger, and carries them back to their normal positions. The letters as they are disengaged from the rollers 96 and 97 fall separately between the threads of a screw conveyer 106 which is arranged horizontally and lengthwise of the machine. The threads of this conveyer are sufficient in depth to support a letter in a vertical position, and sufficiently far apart to accommodate a thick letter. The shaft 107 of this conveyer is mounted in standards 108 secured to the bed and on the outer end of this shaft is a bevel gear 109 which meshes with a bevel gear 110 mounted on a vertical spindle 111 supported in an arm 112 on the bed. Below the gear 110 is another gear 113 which meshes with a gear 114 on the end of a horizontal shaft 115 and on the other end of this shaft is a gear 116 which meshes with a gear 117 on the spindle of the impression roller. Above and to the side of the conveyer is an auxiliary screw conveyer 118 which is mounted at its inner end in brackets 119 secured to the bed. Motion is imparted to this conveyer 118 by the conveyer 106 through a gear 120 on the shaft 107, and a gear 121 on the conveyer 118, and intermediate gearing 122. Adjacent to the conveyer 106 is a table 123 which is on a line coincident with the top of the hub of this conveyer. The letters as they are freed from the rollers fall separately between the threads and rest edgewise on said hub and on the table along which they are moved by the action of the screw. Adjacent to the conveyer is a roller 124 which is covered with rubber or equivalent material, the periphery of which is slightly above the surface of said table. This roller is rotated by a belt 125 which is passed around a sheave 126 on the shaft of the roller and around a sheave 127 on the shaft 107. This roller rotates in a direction toward the conveyer and operates to engage the lower edges of the letters and move them against the auxiliary conveyer in order that they shall be in the proper position when they leave the conveyers. The thread of the auxiliary conveyer is enlarged at its outer end and terminates slightly beyond the end of the conveyer 106 in order that the letters may be properly aligned as will presently be explained.

Figure 13:
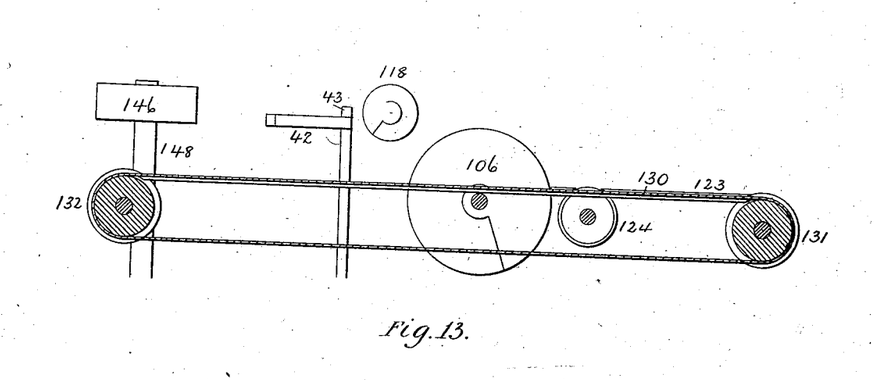
Fig. 13 a longitudinal central section of the endless belt and showing the screw conveyer in relation thereto.

128 represents a finger secured to the guide 129 of the stacking table, which operates to guide the inner ends of the letters in their respective threads on the auxiliary conveyer. The letters as they leave the conveyer are deposited separately on an endless belt 130 which is arranged transversely to the bed, and is passed around two pulleys 131, 132 mounted on brackets 133, 134 bolted to the bed. This belt is operated by a sheave 135 secured to shaft 107, through a belt 136 which is passed around said sheave and a sheave 137 on the pulley 131. The belt operates to carry the letters from the conveyer to the fingers 42 and 44, where the letters are held previous to the stamping operation and are engaged and released therefrom by the die and compression plate as has been previously explained. Above the belt is an auxiliary belt 138 which rotates in the same direction and serves as a moving wall for the letters as they are carried forward to the die. This belt is passed around two horizontal sheaves 139 and 140 the former being mounted on a vertical spindle 141, mounted on an arm 142 bolted to the bed.

142* is a sheave secured to the sleeve 143 of the sheave 139, and 144 is a belt which is passed around the sheave 142 and a sheave on the compression roller spindle, and through which the belt is actuated. The sheave 140 is mounted on a spindle 145 secured to the bed. The outer end of the auxiliary conveyer terminates at a point about midway of the width of the belt, and so that portion of the letters held by the main conveyer is disengaged therefrom previous to the portion held by the auxiliary conveyer. The letters are deposited on the belt at a slight angle which prevents any liability of their being deposited between the edge of the belt and the end of the thread of the main conveyer. The letters during the stamping operation receive an impetus from the rapid revolution of the die and compression plate which carries them between two horizontally arranged rollers 146, 147, the former being mounted on a vertical spindle 148 supported on the bed and rotated by a belt 149 which is passed around a sheave 150 on said spindle and around a sheave 151 on the spindle 152 of the re-stacking roller 153 presently to be described. The other roller 147 is mounted on a spindle 154 secured to an arm 155 which latter is pivoted to a post 156 supported on the bed. This roller has a yielding contact with the roller 146 by the action of a coil spring 157 which is secured at one end to the arm 155 and at its other end to a pin 158 on the re-stacking table. The letters are moved forward rapidly by the impetus given by the rollers onto the re-stacking table 159 which is supported at the other side of the machine by brackets 160 and is provided with the wall 161 against which the letters are re-stacked and with guides 162 and 163 which direct the passage of the letters. The re-stacking roller 153 is faced with rubber or equivalent material and is mounted on the spindle 152 which is set in an arm 164 bolted to the bed. This roller is rotated through a sheave 165 which has connection by means of a belt 166 with a sheave 167 on the spindle of the impression roller. Below this roller is a disk 168 which is rotated therewith and engages with the lower end of the letter to keep it in a vertical position.

169 is a follower between which and the roller 153 the letters are re-stacked. This follower has a lateral movement which is imparted to it by the letters as they are moved in position between it and the roller, and 170 is a set screw which is passed through a slot in the wall and secured to said follower, and which by reason of the spring 171 interposed between it and the outer surface of the wall, regulates the frictional contact of the follower and wall. The guide 162 is provided with an incline 172 which directs the letters to the roller and the revolution of the latter acting in conjunction with the follower, operates to re-stack the letters.

The operation is as follows:—The follower on the stacking table 59 is moved backward by hand and the letters are placed edgewise and inserted between said follower and the face plates on the separating mechanism. The follower operates to feed the letters forward under pressure, and at each downward movement of the separating finger, one letter is engaged by the points on said finger and carried downward to a point where its lower edge is engaged by the rollers 96 and 97. These rollers deposit the letter between the threads of the conveyer which with the auxiliary conveyer operate to feed the letter forward to the endless belt, and the combined action of this belt and the auxiliary belt 138 operate to move the letter and bring it between the fingers 42 and 44 where it is temporarily held. The revolution of the die and compression plate causes the outer end of the lever 38 which as before stated moves in the path of the letters, to engage the letter and release the pin 32 which is depressed and operates to lock the compression plate and present it in unyielding contact with the die. The rotation of the die operates through the action of the cam 27 to unlock the yielding finger 44 and release the letter which is then engaged between the die and compression plate and impressed with the post and cancellation marks. The letter as it leaves the die and plate is engaged by the rollers 146 and 147 and sufficient impetus is given thereby to carry it between the guides 162 and 163 on to the re-stacking table and in contact with the roller 153. The revolution of this roller operates to move the letter between it and the follower 169 the latter being moved backward by the letters as they are re-stacked. In the event of two or more letters being separated simultaneously and deposited in the conveyer the operator can as they are being conveyed, easily withdraw them, as it is understood the letters must travel the length of the conveyer before reaching the belt and are plainly in sight.

A machine is shown and described which is adapted to be operated by electricity or other equivalent power; but it will be evident that the machine could be constructed to operate by the power of the foot or hand.

It will be observed from a reading of the foregoing that the parts are comparatively few and simple in construction; and that most of them are continuously operated in their directions which is an essential feature in machines of this character where a high rate of speed is desired.

The machine is very effective, and the liability of breakage or getting out of order is reduced to the minimum. The letters during the several operations are in sight of the operator, and may be removed at any stage.

What is claimed as new, and desired to be secured by Letters Patent, is—

1. In a post-marking and stamp-canceling machine, the combination of mechanism for separating the letters and feeding them to a screw conveyer arranged to convey them in their separated condition, the screw conveyer, means for forwarding the separated letters from said conveyer into position to be impressed, a revolving die and compression plate for impressing the letters, mechanism for restraining and releasing said compression plate, and mechanism for receiving and automatically re-stacking the impressed letters, the several mechanisms being combined and operating substantially as set forth.

2. In a postmarking and stamp-canceling machine, the combination of mechanism for separating the letters, and feeding them to a screw conveyer below such separating mechanism, the screw conveyer, an endless belt adjacent to the end of such conveyer for moving the letters into position to be impressed, a revolving die for impressing the letters, a revolving compression plate normally restrained, mechanism operated by the letter to be impressed, for bringing said plate into action, and mechanism for automatically re- stacking the impressed letters, all combined and operating substantially as set forth.

3. In a postmarking and stamp-canceling machine, mechanism for separating the letters consisting of a shaft, and means for vertically reciprocating the same, a finger having points thereon for engaging the surface of a letter, secured to arms loosely mounted on said shaft, an arm rigid with said shaft, and a yielding connection between said loose arms and the rigid arm.

4. In a postmarking and stamp-canceling machine, the combination of a finger having points thereon for engaging the surface of a letter, means for vertically reciprocating said finger, a roller adapted to rotate in a direction opposite to the downward movement of the letter, feeding rollers, one of which is fixed and the other in yielding contact therewith substantially as and for the purposes set forth.

5. In a postmarking and stamp-canceling machine, the combination with mechanism for separating the letters, a screw conveyer for conveying the letters in a separated condition therefrom, an endless revoluble belt on which the letters are deposited by the conveyer, and an auxiliary revoluble belt above the same for the purpose set forth.

6. In postmarking and stamp-canceling machines, and in combination with a normally yielding revoluble compression plate, of a revoluble die having thereon a spring actuated rib for restraining said plate and mechanism for bringing said plate into action adapted to be operated by the letter to be impressed.

7. In postmarking and stamp-canceling machines, the combination of mechanism for feeding the letters in a separated condition, an endless revoluble belt, fingers arranged in the path of the belt for checking the movement of a letter, one of which is fixed and the other having yielding contact therewith, a pin normally depressed and having a stud thereon which normally locks the yielding finger, a revoluble die, a revoluble compression plate, a cam on the die operating to raise the pin and unlock the finger, and release the letter for the purpose set forth.

8. In a postmarking and stamp-canceling machine, the combination of mechanism for temporarily holding a letter, a revoluble die, a revoluble compression plate normally restrained and mechanism for bringing said plate into action consisting of a lever normally in the path of the letter to be impressed, a pin adapted to be depressed when released by said lever to lock the plate.

9. In a postmarking and stamp-canceling machine, the combination of mechanism for temporarily holding a letter, a revoluble die, a revoluble compression plate having a spindle normally unlocked, a pin normally raised above said spindle, a lever normally locking said pin in its raised position, and adapted to be actuated by the letter to be impressed to release said pin and permit it to drop and engage the spindle to lock the same, a second pin, a plate connecting the pins and a cam in the path of said second pin to raise the pins to their normal raised positions.

10. In a postmarking and stamp-canceling machine, the combination of a revoluble die and compression plate, two rollers arranged in the path of the letters, a table adjacent to said rollers, guides on the table, a follower thereon and a roller operating in connection with said follower to stack the letters in the manner set forth.

WM. HOWARD,
Administrator of the estate of William Cecil Howard, deceased.

Witnesses:
W. O. CUSBY,
WILL T. NORTON.